United States Patent
Moore

(10) Patent No.: US 9,956,581 B2
(45) Date of Patent: May 1, 2018

(54) MASKING KIT FOR HATCH PERIMETERS

(71) Applicant: Heath Moore, Savannah, GA (US)

(72) Inventor: Heath Moore, Savannah, GA (US)

( * ) Notice: Subject to any disclaimer, the term of this patent is extended or adjusted under 35 U.S.C. 154(b) by 3 days.

(21) Appl. No.: 15/453,545

(22) Filed: Mar. 8, 2017

(65) Prior Publication Data

US 2017/0173625 A1 Jun. 22, 2017

Related U.S. Application Data

(63) Continuation of application No. 13/720,130, filed on Dec. 19, 2012, now Pat. No. 9,623,438.

(51) Int. Cl.
*B05C 21/00* (2006.01)
*B05B 15/04* (2006.01)
*B64C 1/14* (2006.01)

(52) U.S. Cl.
CPC .......... *B05C 21/005* (2013.01); *B05B 15/045* (2013.01); *B64C 1/1461* (2013.01)

(58) Field of Classification Search
None
See application file for complete search history.

(56) References Cited

U.S. PATENT DOCUMENTS

| | | | |
|---|---|---|---|
| 2,293,696 A | 8/1942 | Burchell | |
| 2,696,363 A * | 12/1954 | Monson | F16K 3/30 251/183 |
| 3,140,548 A | 7/1964 | Paparpzzi | |
| 3,855,924 A | 12/1974 | Morse | |
| 4,125,658 A | 11/1978 | Miles | |
| 5,260,097 A | 11/1993 | Silvestre | |
| 5,335,849 A | 8/1994 | Forbes | |
| 5,436,027 A | 7/1995 | Offer | |
| 5,464,692 A | 11/1995 | Huber | |
| 5,940,083 A | 8/1999 | Broekhuijsen | |
| 6,237,240 B1 | 5/2001 | Nelson | |
| 6,286,216 B1 | 9/2001 | Braun | |
| 7,156,017 B1 | 1/2007 | Ingraselino | |
| 9,623,438 B2 | 4/2017 | Moore | |
| 2002/0161772 A1 | 10/2002 | Bergelson | |
| 2006/0107850 A1 | 5/2006 | Rinaldi | |
| 2006/0130679 A1 | 6/2006 | Dubois | |
| 2009/0053485 A1 | 2/2009 | Royals | |
| 2013/0160707 A1 | 6/2013 | Moore | |

(Continued)

OTHER PUBLICATIONS

USPTO; Requirement for Restriction dated Jul. 2, 2013 in U.S. Appl. No. 13/605,902.

(Continued)

*Primary Examiner* — Jethro M Pence
(74) *Attorney, Agent, or Firm* — Snell & Wilmer LLP

(57) ABSTRACT

A mask according to the invention includes a masking having a first side, a second side, and a perimeter opening. The second side is either tacky or has an adhesive applied and includes a backing, and the first side may include a cover. In use, the backing is removed to apply the mask to a hatch on a surface, with the perimeter of the hatch exposed through the perimeter opening. If used, the cover is then removed and liquid sealant is applied to the perimeter through the perimeter opening. Excess sealant collects on the masking rather than on the hatch or surface surrounding the perimeter. Once the sealant dries, the masking is removed.

23 Claims, 1 Drawing Sheet

(56) References Cited

U.S. PATENT DOCUMENTS

| | | |
|---|---|---|
| 2013/0164448 A1 | 6/2013 | Moore |
| 2015/0251407 A1 | 9/2015 | Moore |
| 2017/0173618 A1 | 6/2017 | Moore |
| 2017/0173619 A1 | 6/2017 | Moore |

OTHER PUBLICATIONS

USPTO; Non-Final Office Action dated Jan. 28, 2014 in U.S. Appl. No. 13/605,902.
USPTO; Non-Final Office Action dated Aug. 15, 2014 in U.S. Appl. No. 13/605,902.
USPTO; Requirement for Restriction dated Oct. 31, 2014 in U.S. Appl. No. 13/720,130.
USPTO; Final Office Action dated Dec. 4, 2014 in U.S. Appl. No. 13/605,902.
USPTO; Non-Final Office Action dated Jan. 28, 2015 in U.S. Appl. No. 13/720,130.
USPTO; Final Office Action dated Nov. 5, 2015 in U.S. Appl. No. 13/720,130.
USPTO; Non-Final Office Action dated Apr. 11, 2016 in U.S. Appl. No. 13/720,130.
USPTO; Notice of Allowance dated Dec. 5, 2016 in U.S. Appl. No. 13/720,130.
USPTO; Notice of Allowance dated Dec. 30, 2016 in U.S. Appl. No. 13/720,130.
USPTO; Final Office Action dated Jul. 2, 2015 in U.S. Appl. No. 14/198,295.
USPTO; Non-Final Office Action dated Feb. 20, 2015 in U.S. Appl. No. 14/198,295.

\* cited by examiner

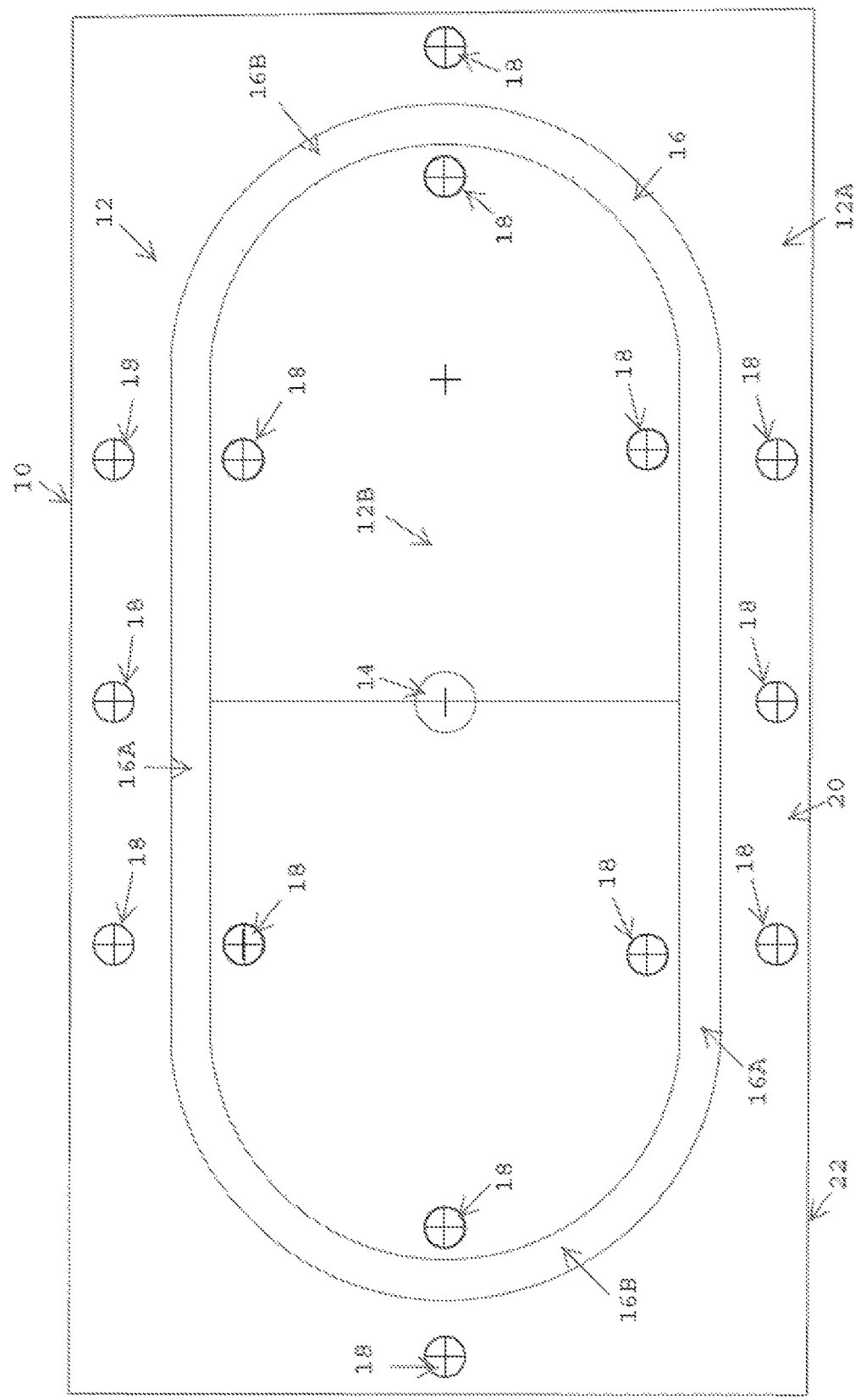

MASKING KIT FOR HATCH PERIMETERS

CROSS REFERENCE TO RELATED APPLICATION

This application is a continuation of U.S. application Ser. No. 13/720,130 entitled "MASK FOR APPLYING HATCH PERIMETER SEALANT," filed on Dec. 19, 2012, the respective disclosure of which is incorporated by reference in its entirety.

FIELD OF THE INVENTION

The present invention relates a mask and method for covering a hatch and surrounding surface when applying a sealant to the perimeter of the hatch.

BACKGROUND OF THE INVENTION

Sealing hatches on machinery, particularly aircraft, requires that a liquid sealant be applied (preferably by spraying) onto the perimeter between an external hatch (such as the hatch on an airplane body) and the main surface in order to provide a tight seal and low drag at high altitudes and speeds. The hatches referenced herein are typically those that permit access to an area inside the outer surface, such as an area containing an electrical or hydraulic system, that requires periodic maintenance. Presently, these hatches are normally sealed by first applying tape to the surface of the hatch and the surrounding surface (such as the body of the plane surrounding the hatch perimeter) and then spraying the sealant onto the perimeter. Some of the sealant collects on the tape, which is ultimately removed from the surface. So, the tape prevents the sealant from collecting on the hatch or the surface surrounding the perimeter. Normally, standard duct tape or painter's tape is used for this purpose. Applying the tape and removing it is time consuming, which leads to more maintenance time than necessary.

SUMMARY OF THE INVENTION

The invention provides a pre-formed mask that is simple to apply and remove from a surface, that greatly reduces the time required to mask a surface (such as the hatch and surface of a plane near the hatch), and that is custom sized and configured for a given hatch. Also disclosed is a kit of masks designed for a particular surface (such as for a particular type of airplane), wherein the kit contains at least one mask sized and configured to fit each hatch on the surface.

Each mask includes multiple components. One is the masking that blocks the sealant from contacting the hatch or surface surrounding the perimeter. The masking is preferably a sheet of flexible plastic that is translucent (it should preferably have some cloudiness or colorization so it is easier to visually position the mask properly on the surface). The masking preferably has an adhesive backing or is a tacky material so it can stick to the surface once properly positioned. The masking has one or more open portions called perimeter openings that are positioned to expose the perimeter of the hatch.

The mask also preferably includes a backing that is removed to expose adhesive (or the tacky masking material) on one side of the mask. When the backing is removed, the mask can be adhesively applied to the surface of the plane, with the perimeter opening exposing the perimeter, and the masking covering the hatch and the surface surrounding the perimeter.

Another preferred component is a cover on the surface of the mask opposite the backing. Preferably the cover is transparent or translucent, so a user can see the masking and the surface in order to properly position the mask on the hatch and align the perimeter opening with the perimeter. The purpose of the cover is to provide support for the masking so that it is relatively simple for a user to properly place. Without the cover, the mask component could be too flexible and bend or fold over when a user attempts to position it. Also, the masking is normally two or more separate, unconnected pieces, because the perimeter opening usually divides it into multiple pieces. So, the cover holds the pieces of the masking together in proper alignment for placement on the surface. Once the masking is attached to the surface, the cover is removed to expose the masking and perimeter opening. If the perimeter opening does not divide the masking into multiple pieces, the cover would not be required.

Also disclosed is a kit for a surface (such as a plane) that includes at least one mask configured to align with each hatch on the plane. It is typical for a plane to have well in excess of 100 external hatches that must be resealed on a regular basis.

BRIEF DESCRIPTION OF THE DRAWINGS

FIG. 1 is an embodiment of a mask according to the invention.

DETAILED DESCRIPTION OF PREFERRED EMBODIMENTS

Turning now to FIG. 1, wherein the purpose is to describe a preferred embodiment of the invention and not to limit same, an exemplary mask 10 is shown.

Mask 10 is sized and configured to seal the perimeter of a hatch on a surface. In the embodiment shown, mask 10 includes a masking 12, an opening 14, and a perimeter opening 16. Mask 10 also includes markings 18 that align with corresponding reference markings (such as rivets, screw heads, bolts, or any visible marking) on the surface to properly align mask 10 on the surface to which it is applied.

Masking 12 is preferably formed of translucent vinyl, but can be made of any suitable material. If masking 12 is translucent, a user can visually align markings 18 with the corresponding reference markings on the surface, and also distinguish between the masking 12 and the perimeter opening 16, which also can help with proper alignment.

Masking 12 should be flexible enough to conform to contoured or curved surfaces, such as the surfaces on an airplane. The vinyl used for masking 12 is preferably made from flexible vinyl mask material. Masking 12 preferably has a light adhesive (not shown) applied on its back side and a backing (not shown) on the adhesive, that is removed in order to apply masking 12 to the surface once mask 10 is properly positioned.

The masking material should be resistant to solvents (if the sealant used will be solvent-based), so when the sealant is applied, the masking 12 does not dissolve or otherwise lose the characteristics that makes it suitable for use.

Materials that may be used for mask 10 typically come in rolls of various lengths and widths. A preferred material comes in a roll 40" wide by 150' long, although any suitable size may be used. One such material is ORACAL paint mask vinyl, and another is made by AVERY.

Mask 10 includes one or more perimeter openings 16. The perimeter opening(s) are to allow sealant to pass through and seal the perimeter of a hatch. In this embodiment, perimeter opening 16 has straight sides 16A and curved ends 16B, but perimeter opening 16 is of any suitable shape to expose the perimeter of the hatch that will be sealed. Perimeter opening divides masking 12 into an outside section 12A and an inside section 12B. The cover (not shown) keeps masking 12 in position temporally until the backing (not shown) is removed from the back of mask 10 and the masking is adhered to the surface.

Alternatively, perimeter opening may not be a continuous opening, but may contain binding pieces of material that connect section 12A and section 12B. These sections can later be removed after the masking 12 is applied to the surface in order to create a continuous opening 16. In that case, the cover may not be required since inside section 12B and outside section 12A are connected until masking 12 is applied to the surface.

In this example, mask 10 has a masking 12 with an inner portion 12B, an outer portion 12A, an opening 14 centered in inner portion 12B. Opening 14 is optional and is utilized by a user to remove the inside section 12B, because the outer edges of section 12B will be covered with sealant and are difficult to lift from the surface. Opening 14 can be of any suitable size and located at any suitable position.

Markings 18 can be of any shape, size or location to align with corresponding markings on the surface or hatch in order to position mask 10 so that the perimeter opening or openings 16 are over the perimeter that will be sealed.

Mask 10 can be held in place initially by a section of tape. Masking (or painter's) tape may be used for this purpose. This could be any suitable tape, such as standard masking or painter's tape (which has a relatively light adhesive backing). This may be used on an edge of each mask 10 to initially place each of the masks 10 on the surface, to be certain that each aligns properly, prior to attaching each mask 10 onto the surface using the adhesive backing.

If tape is used to temporarily adhere a mask 10 to the surface, the mask 10 does not have to be removed from the surface in its entirety to remove the backing and adhesively apply mask 10 directly to the surface. Mask 10 could just be pulled away from the surface while still being connected by the tape on one edge in order to expose and remove its backing and then adhere the mask 10 to the surface.

Preferably, multiple masks 10 are organized as a kit, so there is at least one mask 10 for each hatch on a particular surface. This is useful for machines such as airplanes that have numerous hatches of varying sizes that should be sealed after the hatches are opened to access the interior. A single plane may have over 100 hatches, and as many as 150 hatches or more. So, a kit of masks for an airplane would have at least one mask for each hatch on the airplane. Therefore, such a kit could include masks of varying shapes and/or sizes, with different size and shape perimeter opening(s) 16 that correspond to each hatch. Markings 18 could also vary according to the corresponding markings on the airplane surface and/or hatch where the particular mask 10 will be positioned.

To assist a user in positioning a mask 10 onto a surface, such as the surface of an airplane, an image of the surface (such as an airplane) could be printed onto each mask 10, showing the position of the hatch on which each mask 10 should be placed. Alternatively or additionally, a map or image, or a plurality of maps and images, may be provided as part of the kit and separate from the masks themselves, wherein the map or images show where each mask 10 is to be applied to the surface.

The mask 10 can either be created manually or by computer modeling of the hatches to which each mask 10 is to be applied.

Once the computer program has created the mask pattern using information inputted by a user, the program directly or indirectly controls a machine to punch the perimeter opening(s) 16 and opening 14 in the mask material, and to add markings 18. In one embodiment, the respective markings 18 are printed onto each hatch 10, although any suitable technique can be used to form the markings 18.

Once punched and printed, the vinyl mask roll can then be cut into individual mask pieces. This could be done by a machine or by hand, and may be done as the vinyl mask is being marked and the openings are being punched.

Applying the Masks

Each mask 10 is applied to the surface by identifying its location on the surface using indicia as explained above, such as an image of the surface showing the hatch for which each mask 10 is configured. Each mask 10 is preferably first applied to the surface by applying masking tape or any other suitable tape to one or more edges of the mask, and, when the mask 10 is properly positioned on the surface relative the appropriate hatch, the mask 10 is attached to the surface as previously described.

Having thus described some embodiments of the invention, other variations and embodiments that do not depart from the spirit of the invention will become apparent to those skilled in the art. The scope of the present invention is thus not limited to any particular embodiment, but is instead set forth in the appended claims and the legal equivalents thereof. Unless expressly stated in the written description or claims, the steps of any method recited in the claims may be performed in any order capable of yielding the desired result.

What is claimed is:

1. A kit including a plurality of masks used in connection with sealing a perimeter of a hatch, while shielding at least part of a surface surrounding the perimeter, each of the plurality of masks comprising:
    a masking having an inner portion, an outer portion, and a perimeter opening that separates the inner portion and the outer portion, the perimeter opening for exposing the perimeter to be sealed when the masking is applied;
    a first side and a second side;
    an adhesive backing positioned on the second side; and
    a cover positioned on the first side; wherein the cover is transparent or translucent.

2. The kit of claim 1, wherein at least one of the plurality masks is different from each of the other plurality of masks with respect to one or more of the following: size, shape, or configuration.

3. The kit of claim 1, wherein there are at least five different mask configurations.

4. The kit of claim 1, wherein there are at least ten different mask configurations.

5. The kit of claim 1, wherein all of the plurality of masks are packaged in a single box.

6. The kit of claim 1, wherein the hatch is one of a plurality of hatches and each of the plurality of masks includes an image showing which hatch of the plurality of hatches each of the plurality of masks is to be positioned on.

7. The kit of claim 6, wherein the image is of at least part of an airplane and shows a location on the airplane where each of the plurality of masks is to be positioned.

8. The mask of claim 1, wherein the adhesive of the adhesive backing is selected from a type that leaves no residue on the surface when the mask is removed.

9. The kit of claim 1, wherein each of the plurality of masks includes an image depicting where each of the plurality of masks is to be positioned on the surface.

10. The kit of claim 1, further comprising one or more maps separate from the plurality of masks, wherein the one or more maps shows where each of the plurality of masks in the kit is to be positioned on the surface.

11. The kit of claim 1, wherein the plurality of masks includes over 100 masks.

12. The kit of claim 1, wherein the plurality of masks includes masks of three or more sizes.

13. The kit of claim 10, wherein each of the plurality of masks has an indicia that corresponds to indicia on the one or more maps that depicts where each of the plurality of masks is to be located on the surface.

14. The kit of claim 1, wherein the perimeter opening of each of the plurality of masks divides the masking into two separate pieces.

15. The kit of claim 1, wherein the masking of each of the plurality of masks is translucent.

16. The kit of claim 1, wherein the adhesive backing covers the entire second side of each of the plurality of masks.

17. The kit of claim 1, wherein the adhesive backing on each of the plurality of masks has a removable layer that covers the adhesive of the adhesive backing.

18. The kit of claim 1, wherein the masking of each of the plurality of masks is comprised of flexible vinyl.

19. The kit of claim 1, wherein the cover of each of the plurality of masks is comprised of flexible vinyl.

20. The kit of claim 1, wherein there is no adhesive between the masking and the cover on any of the plurality of masks.

21. The kit of claim 1, wherein each of the plurality of masks includes markings configured to align with corresponding markings on the surface to which each of the plurality of masks will be applied in order to align each of the plurality of masks onto the surface.

22. The kit of claim 21, wherein at least one of the markings aligns with a rivet on the surface.

23. The kit of claim 1, wherein there is an opening in the inner portion to assist in removal of the inner portion after a sealant is applied.

* * * * *